(12) United States Patent
Randall et al.

(10) Patent No.: US 12,386,507 B2
(45) Date of Patent: *Aug. 12, 2025

(54) CREATION AND USE OF AN EFFICIENCY SET TO ESTIMATE AN AMOUNT OF DATA STORED IN A DATA SET OF A STORAGE SYSTEM HAVING ONE OR MORE CHARACTERISTICS

(71) Applicant: NetApp, Inc., San Jose, CA (US)

(72) Inventors: Charles Randall, Longmont, CO (US); Alyssa Proulx, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,641

(22) Filed: May 23, 2024

(65) Prior Publication Data

US 2024/0319872 A1 Sep. 26, 2024

Related U.S. Application Data

(63) Continuation of application No. 18/057,869, filed on Nov. 22, 2022, now Pat. No. 12,014,045, which is a
(Continued)

(51) Int. Cl.
*G06F 3/06* (2006.01)
*G06F 11/30* (2006.01)
(Continued)

(52) U.S. Cl.
CPC .......... *G06F 3/0605* (2013.01); *G06F 3/0608* (2013.01); *G06F 3/0641* (2013.01);
(Continued)

(58) Field of Classification Search
CPC .... G06F 3/0605; G06F 3/0608; G06F 3/0641; G06F 3/0683; G06F 11/3034; G06F 11/324; G06F 11/3409
See application file for complete search history.

(56) References Cited

U.S. PATENT DOCUMENTS 9,424,285 B1 8/2016 Condict et al.
9,678,968 B1 6/2017 Taylor et al.
(Continued)

OTHER PUBLICATIONS

Extended European Search Report for Application No. EP21202144.8 mailed on Mar. 24, 2022, 13 pages.
(Continued)

*Primary Examiner* — Eric T Oberly
(74) *Attorney, Agent, or Firm* — Jaffery Watson Hamilton & DeSanctis LLP

(57) ABSTRACT

Systems and methods for sampling a set of block IDs to facilitate estimating an amount of data stored in a data set of a storage system having one or more characteristics are provided. According to an example, metadata (e.g., block headers and block IDs) may be maintained regarding multiple data blocks of the data set. When one or more metrics relating to the data set are desired, an efficiency set, representing a subset of the block IDs of the data set, may be created to facilitate efficient calculation of the metrics by sampling the block IDs of the data set. Finally, the metrics may be estimated based on the efficiency set by analyzing one or more of the metadata (e.g., block headers) and the data contained in the data blocks corresponding to the subset of the block IDs and extrapolating the metrics for the entirety of the data set.

25 Claims, 10 Drawing Sheets

Related U.S. Application Data continuation of application No. 17/079,249, filed on Oct. 23, 2020, now Pat. No. 11,526,275.

(51) Int. Cl.
  *G06F 11/32* (2006.01)
  *G06F 11/34* (2006.01)
(52) U.S. Cl.
  CPC ........ *G06F 3/0683* (2013.01); *G06F 11/3034* (2013.01); *G06F 11/324* (2013.01); *G06F 11/3409* (2013.01)

(56) References Cited

U.S. PATENT DOCUMENTS

| | | | |
|---|---|---|---|
| 10,331,362 B1 * | 6/2019 | Parekh | ............... G06F 16/1748 |
| 10,613,794 B1 | 4/2020 | Verma et al. | |
| 11,526,275 B2 | 12/2022 | Randall et al. | |
| 12,014,045 B2 | 6/2024 | Randall et al. | |
| 2010/0333116 A1 | 12/2010 | Prahlad et al. | |
| 2015/0143063 A1 * | 5/2015 | Mutalik | ............. G06F 11/1446 711/162 |
| 2015/0309733 A1 | 10/2015 | Fornander et al. | |
| 2015/0309746 A1 | 10/2015 | Fornander et al. | |
| 2017/0315875 A1 | 11/2017 | Tirupati Nagaraj et al. | |
| 2018/0081541 A1 | 3/2018 | Uppal et al. | |
| 2018/0113640 A1 | 4/2018 | Fernandez et al. | |
| 2019/0227727 A1 | 7/2019 | Wang et al. | |
| 2020/0097374 A1 | 3/2020 | Cason | |
| 2020/0192871 A1 | 6/2020 | Hirsch et al. | |

OTHER PUBLICATIONS

Kalavri V., et al., "Block Sampling: Efficient Accurate Online Aggregation in MapReduce," IEEE 5th International Conference on Cloud Computing Technology and Science, Bristol, UK, 2013, pp. 250-257.

NetApp., "API Reference Guide," NetApp Element 11.0, Nov. 2018, 536 pages.

Notice of Allowance mailed on Feb. 22, 2024 for U.S. Appl. No. 18/057,869, filed Nov. 22, 2022, 08 pages.

\* cited by examiner

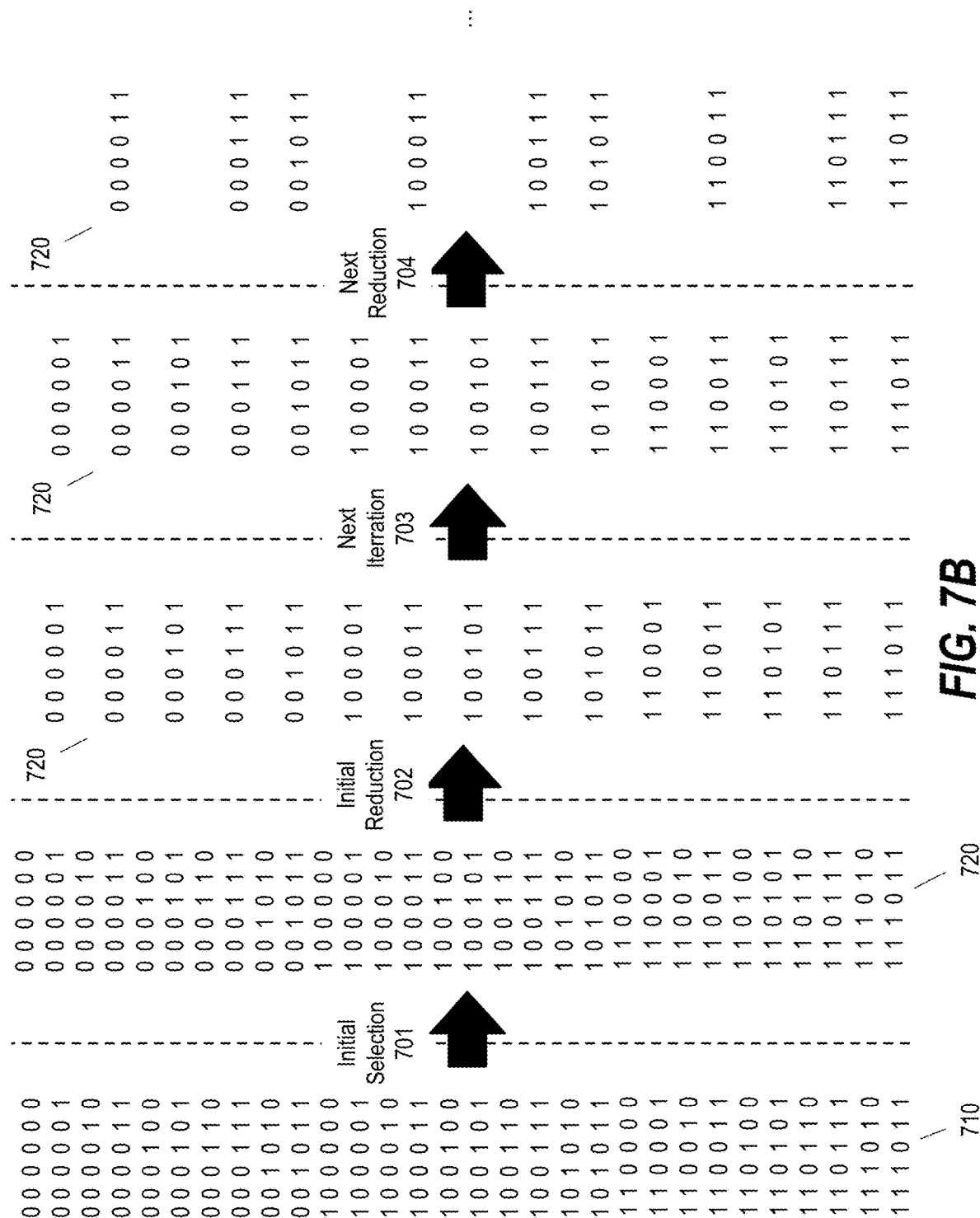

CREATION AND USE OF AN EFFICIENCY SET TO ESTIMATE AN AMOUNT OF DATA STORED IN A DATA SET OF A STORAGE SYSTEM HAVING ONE OR MORE CHARACTERISTICS

CROSS-REFERENCE TO RELATED APPLICATIONS

This application is a continuation of U.S. patent application Ser. No. 18/057,869, filed Nov. 22, 2022, which is a continuation of U.S. patent application Ser. No. 17/079,249, filed Oct. 23, 2020, now U.S. Pat. No. 11,526,725. The contents of both of the foregoing patent applications are hereby incorporated by reference in their entirety for all purposes.

BACKGROUND

Field

Various embodiments of the present disclosure generally relate to data storage systems. In particular, some embodiments relate to improving system operation and user experience based on estimated amounts of data stored in a particular type (e.g., a snapshot) or level (e.g., an account or a volume) of a data store of a distributed storage system having one or more characteristics (e.g., uncompressed, compressed by a particular compression algorithm, entropy, and/or type of data).

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may, among other things, indicate whether the data stored within a particular block is uncompressed or compressed and identify storage locations on the devices for the data. The data of each volume may be divided into data blocks. The data blocks may be distributed in a content driven manner throughout the nodes of the cluster. For example, a block identifier (ID) for stored data may be generated by applying a hash function to the data.

Such a content driven approach has advantages in terms of storage efficiency (e.g., deduplication) as the same data stored by multiple clients within the same subscriber account or even potentially spanning multiple subscriber accounts need only be represented once on the storage devices and will have the same block ID; however, other performance monitoring and system management functions are made more complex in such a data storage environment.

SUMMARY

Systems and methods are described for sampling a set of block IDs to facilitate estimating an amount of data stored in a data set of a storage system having one or more characteristics. According to one embodiment, a sample including a subset of storage unit identifiers (IDs) from among storage unit IDs of a particular data set of the storage system is generated to facilitate calculation of one or more metrics pertaining to a characteristic relating to a state of compression, application of a particular compression algorithm, entropy, or a type of data stored in a subset of storage units corresponding to the sample by statistically sampling the storage unit ID. A first metric for data having the characteristic within the sample is then determined by, for each ID within the sample, analyzing one or more of metadata associated with a storage unit to which the ID corresponds and data contained in the storage unit. A second metric for data having the characteristic within an entirety of the particular data set may then be estimated based on the first metric.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 7B illustrates an initial group of block IDs and an example efficiency set as it changes as a result of the iterations of FIG. 7A.

DETAILED DESCRIPTION

Figure 1:
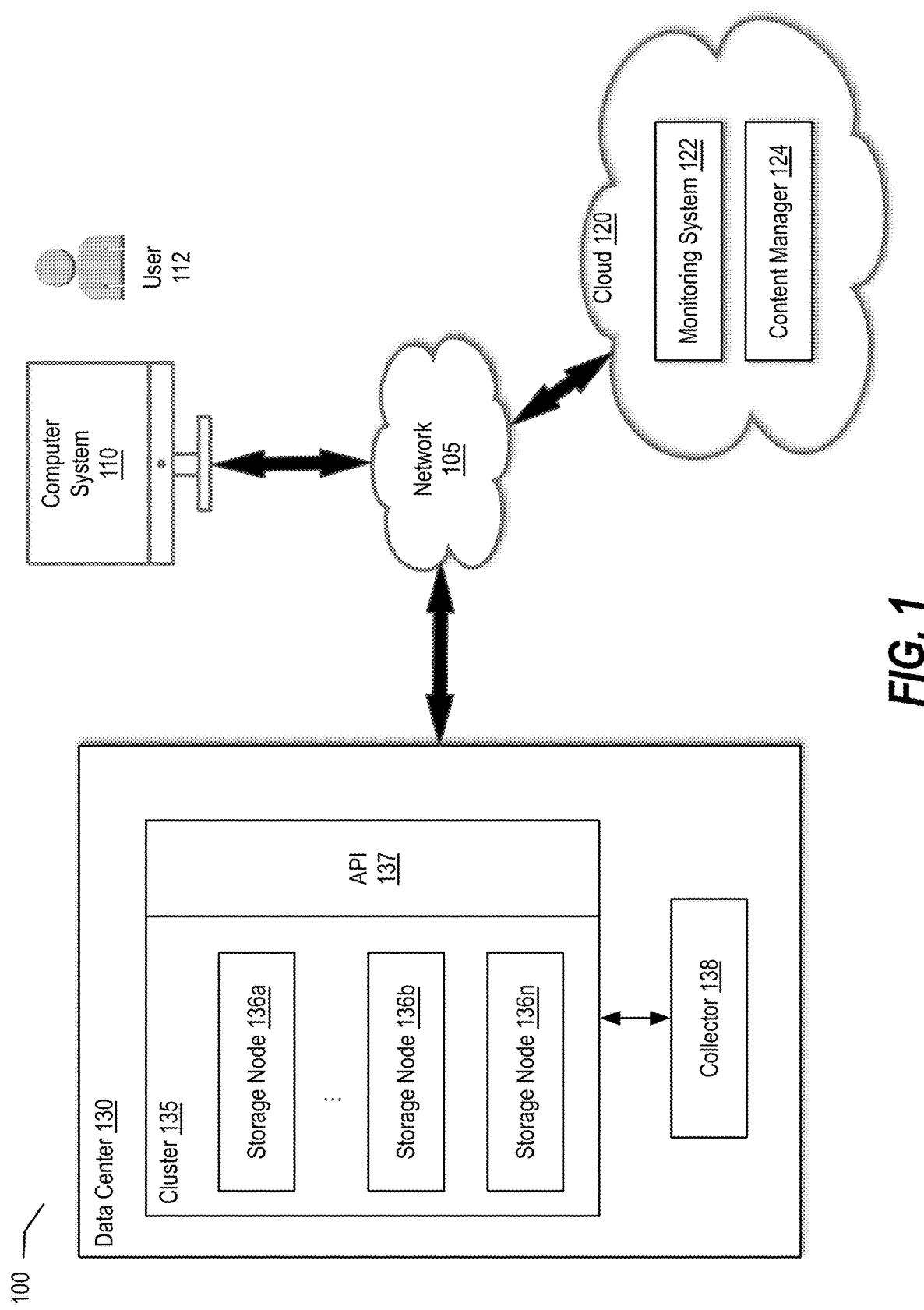
FIG. 1 is a block diagram illustrating an environment in which various embodiments may be implemented.

Systems and methods are described for sampling a set of block IDs to facilitate estimating an amount of data stored in a data set of a storage system having one or more characteristics. As noted above, a content driven storage approach has advantages in terms of storage efficiency (e.g., deduplication) as the same data stored by multiple clients need only be represented once on the storage devices and will have the same block ID. On the other hand, in such a data storage environment, additional complexities arise in connection with obtaining desired information for performance monitoring and system management functions.

In order to monitor the health, efficiency, and operational status of a distributed storage system and or determine whether service guarantees made to customers are being achieved, telemetry data is often monitored. Additional insights into various characteristics of the blocks of data themselves may facilitate tuning and/or otherwise improving the operations of the distributed storage system; however, due to the complexities of extracting, collecting, and, aggregating such information in a distributed storage system that uses a content driven approach, monitoring systems (and hence administrators of such systems) currently have limited or no visibility into such characteristics. While information regarding all blocks of data stored on a distributed storage system may be easily obtained following a brute force approach, a more sophisticated approach is advantageous for both efficiency and for gathering metrics at a desired level of a data store (e.g., at an account level or for a particular volume).

As such, embodiments described herein seek to improve the technological processes of distributed storage system management and monitoring and gathering of various insights into characteristics of blocks of data by, for example, providing an efficient characteristic estimation approach that makes use of a statistical sampling of a set of block IDs for a particular level of a data store of a distributed storage system. Various embodiments of the present technology provide for a wide range of technical effects, advantages, and/or improvements to distributed storage systems and components. For example, various embodiments may include one or more of the following technical effects, advantages, and/or improvements: (i) an efficient approach for sampling a set of block IDs for a given level of a data store; (ii) leveraging the sampling approach to provide visibility into a total amount of data within the given level of the data store that is uncompressed or compressed; (iii) leveraging the sampling approach to estimate entropy of stored data; (iv) leveraging the sampling approach to estimate an amount of data of various types (e.g., images, medical data, binary data, or English text).

In accordance with various embodiments described herein, metadata may be maintained for blocks of the particular level of the data store within the storage system, including a block ID corresponding to each respective block containing data. An efficiency set may then be created representing a subset of the block IDs of the particular level of the data store by statistically sampling the block IDs. Finally, an amount of data stored in the particular level of the data store having one or more characteristics (e.g., uncompressed, compressed by a particular compression algorithm, entropy, and/or type of data) may be estimated based on the efficiency set by, for each block ID in the efficiency set, analyzing one or more of the metadata (e.g., block headers) and the data contained in the corresponding block.

While for completeness, embodiments of the present disclosure are described herein with reference to a particular statistical sampling approach to create an efficiency set of block IDs, embodiments of the present disclosure are applicable to analysis of block metadata and data blocks more generally.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

As used herein, an "efficiency set" generally refers to a subset of a set of block IDs. The set of block IDs may include all block IDs for a particular data set or level of storage (e.g., a set of one or more volumes, a particular volume, a set of one or more snapshots stored on a volume). The subset may be determined by performing a statistical sampling of the set of block IDs to obtain a desired sample size. In various embodiments, the efficiency set may be used to facilitate efficient calculation of one or more metrics relating to the data stored in data blocks corresponding to the block IDs in the efficiency set. The one or more metrics calculated for the efficiency set may them be extrapolated to produce one or more estimated metrics for the particular data set from which the efficiency set was derived. For example, a metric calculated based on the efficiency set may be extrapolated to produce an estimate for the entirety of the particular data set by multiplying the calculated metric by 100/X, where X represents the size of the efficiency set relative to the size of the entirety of the particular data set. An account may include one or more volumes within a distributed storage system. In some embodiments, when metrics relating to the account are desired, the block IDs associated with the account may be identified and statistically sampled to produce a subset of the block IDs for which metadata and/or data stored within the corresponding block may be analyzed. Non-limiting examples of metrics may include estimates of (i) the total amount of data for a particular account or a particular volume that is stored in uncompressed form and/or compressed form, (ii) the entropy of uncompressed data; (iii) the total amount of data compressed with a particular type of compression algorithm; and (iv) the total amount of various types of data. These metrics may in turn be used to determine, among other things, how well various types of compression are working on various types of customer data, whether there is an opportunity to perform compression with some other compression algorithm, and/or whether there is an opportunity to implement system improvements, such as applying specific compressors to certain types of data.

As used herein, "telemetry data" generally refers to performance, configuration and other system data of a monitored system. Telemetry data may refer to one data point or a range of data points. Non-limiting examples of telemetry data for a distributed storage system include latency, utilization, a number of input output operations per second (IOPS), a slice service (SS) load, Quality of Service (QOS) settings, one or more of the various metrics described herein, or any other performance related information.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data and/or various storage efficiency metrics of the distributed storage system or multiple distributed storage systems via a browser-based interface presented on computer system 110. In one embodiment, the administrator and/or automated means may use various statistics, analytics and/or visual representations of the gathered data as feedback to improve the functioning of the monitored systems by, for example, tuning various configuration parameters (e.g., relating to the types of compression algorithms employed or associating a particular compression algorithm with a particular type of data), of the managed distributed storage systems and/or delivering storage operating system patches, version upgrades, or the like to the managed distributed storage systems.

In the context of the present example, the environment 100 includes a data center 130, a cloud 120, a computer system 110, and a user 112. The data center 130, the cloud 120, and the computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a collector 138. Those of ordinary skill in the art will appreciate additional IT infrastructure may be included within the data center 130.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. A non-limiting example of a storage node 136 is described in further detail below with reference to FIG. 4.

The API 137 may provide an interface through which the cluster 135 is configured and/or queried by external actors (e.g., the collector 138, the computer system 110, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. In one embodiment, one or more API calls may be used to obtain information regarding (i) an estimate of a total amount of data within a given level of the data store that is uncompressed or compressed; (ii) an estimate of entropy of uncompressed stored data; (iii) an estimate of a total amount of data of various types (e.g., images, medical data, binary data, or English text) within a given level of the data store. As those skilled in the art will appreciate various other types of telemetry data may be made available via the API 137, including, but not limited to measures of latency, utilization, and/or performance at various levels (e.g., the cluster level, the storage node level, or the storage node component level).

In various examples described herein, the collector 138 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Y seconds) or on demand responsive to a request from user 112. The collector 138 may locally process and/or aggregate the collected telemetry data over a period of time by data point values and/or by ranges of data point values and provide frequency information regarding the aggregated telemetry data retrieved from the cluster 135 to the centralized monitoring system.

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system (e.g., monitoring system 122) and a content manager 124. The monitoring system 122 may periodically receive monitored information, including raw and/or processed telemetry data (e.g., frequency distributions representing aggregated telemetry data over time) of multiple clusters (e.g., cluster 135) from multiple distributed collectors (e.g., collector 138) operable within respective data centers (e.g., data center 130) of one or more customers of the managed service provider. Depending upon the particular implementation, the monitored information may be pushed from the collector 138 or pulled from the collector 138 in accordance with a monitoring schedule or responsive to an event (e.g., a request issued by user 112 to the monitoring system 112).

In one embodiment, the content manager 124 may generate an efficiency set at, for example, a snapshot level, a volume level, or an account level (e.g., a set of one or more volumes). For example, if user 112 desires to obtain one or more metrics relating to data stored in uncompressed or compressed form, entropy of uncompressed data, and/or types of data stored, the content manager may generate an efficiency set for the particular type or level of the data store by statistically sampling the block IDs for the particular type or level of the data store. Efficiency sets are explained in greater detail below. Depending upon the particular implementation the content manager 124 may coordinate retrieval of the desired metrics via the monitoring system 112 or may directly obtain the desired metrics via API 137.

In one embodiment, the monitoring system 122 and/or the content manager 124 may facilitate visualization of the monitored information and telemetry data received from the cluster 135. Depending upon the particular implementation, some aspects of visualization processing may be performed and/or applied by the monitoring system 122 and/or the content manager 124 and other aspects of the visualization processing may be performed and/or applied by the computer system 110, for example, by a web browser running on the computer system 110 performing dynamic code execution of code (e.g., JavaScript) delivered to the browser and embedded within a web page (e.g., a Hypertext Markup Language (HTML) file) by or on behalf of the monitoring system 122 or the content manager 124. Non-limiting examples of graphical representations of various metrics are described below with reference to FIGS. 8A-B.

Although in the context of the present example, the monitoring system 122 and the content manager 124 are illustrated as being separate from the cluster 134 and the storage nodes 136a-n, in other examples, either or both of the monitoring system 122 and the content manager 123 may be incorporated within the cluster 135 or within a storage node 136

While for sake of brevity, only a single data center and a single cluster are shown in the context of the present example, it is to be appreciated that multiple clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
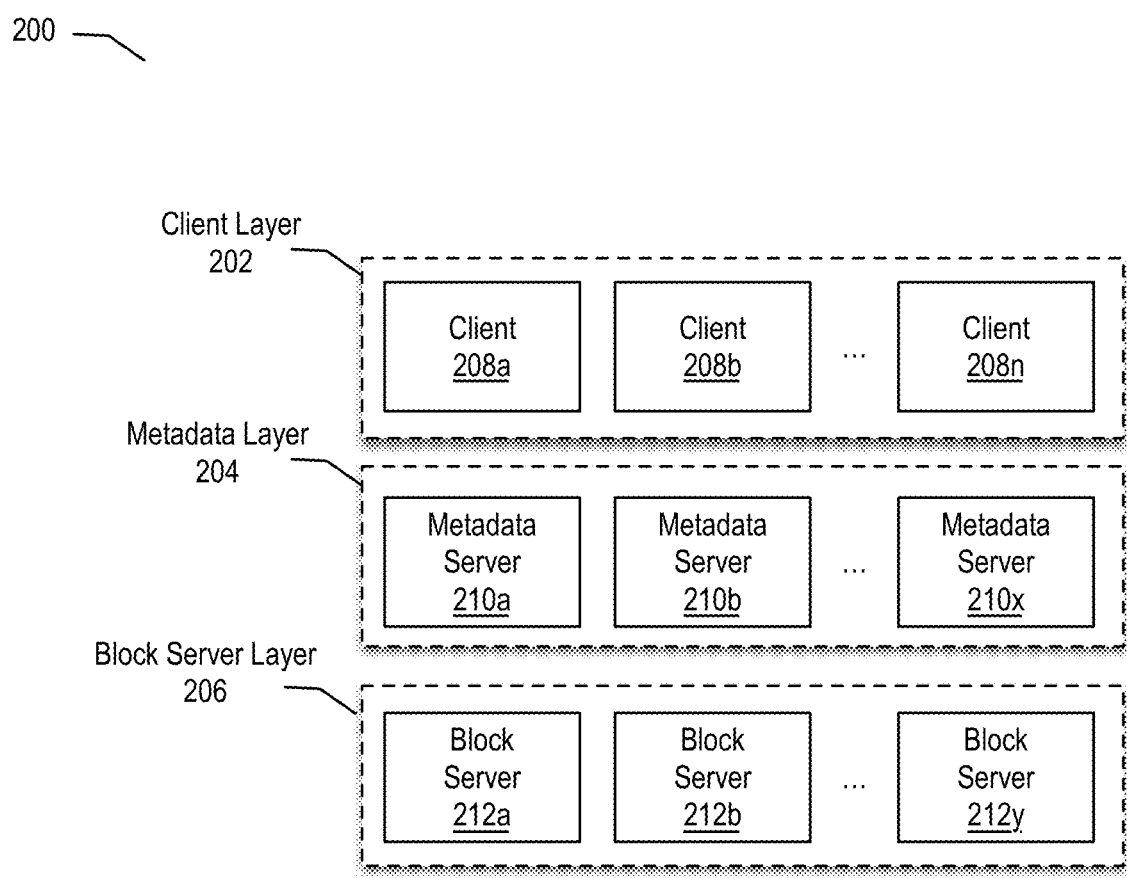
FIG. 2 is a block diagram conceptually illustrating a distributed data storage system in accordance with various embodiments of the present disclosure.

FIG. 2 is a block diagram conceptually illustrating a distributed data storage system 200 in accordance with various embodiments of the present disclosure. In the context of the present example, the distributed data storage system 200 includes a client layer 202, a metadata layer 204, and a block server layer 206. The client layer 202 is shown including clients 108a-n. The metadata layer 204 is shown including metadata servers 210a-x. The block server layer 206 is shown including block servers 212a-y. Although the client layer 202 is shown with three clients 208, the metadata layer 204 is shown with three metadata servers 210, and the block server layer 206 is shown with three block servers 212, these examples are not intended to be limiting and in other examples, the client layer 202, the metadata layer 204, and the block server layer 206 may include any number (one or more) of clients 208, metadata servers 210, and block servers 212, respectively.

Although the parts of the distributed data storage system 200 are shown as being logically separate, entities may be combined in different fashions. For example, the functions of any of the layers may be combined into a single process or single machine (e.g., a computing device) and multiple functions or all functions may exist on one machine or across multiple machines. When operating across multiple machines, the machines may communicate using a network interface, such as a local area network (LAN) or a wide area network (WAN). In some embodiments, one or more metadata servers 210 may be combined with one or more block servers 212 in a single machine. Entities in the system 200 may be virtualized entities. For example, multiple virtual block servers 212 may be included on a machine. Entities may also be included in a cluster (e.g., cluster 135), where computing resources of the cluster are virtualized such that the computing resources appear as a single entity.

The clients 208 include client processes that may exist on one or more physical machines. A client process may be responsible for storing, retrieving, and/or deleting data in the system 200. A client process may address pieces of data depending on the nature of the storage system and the format of the data stored. For example, the client process may reference data using a client address, which may take different forms. For example, in a storage system that uses file storage, the client 208 may reference a particular volume or partition, and a file name. For object storage, the client address may be a unique object name. For block storage, the client address may be a volume or partition, and a block address (e.g., a logical block address (LBA)). The clients 208 may communicate with the metadata layer 204 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

The block servers 212 store data for clients 208. In some embodiments, data may be broken up into one or more storage units. A storage unit may also be referred to as a data block. Data may be segmented into data blocks. A block may represent the raw data for a volume and may be the smallest addressable unit of data. Data blocks may be of a fixed size, may be initially a fixed size but compressed, or may be of a variable size. Data blocks may also be segmented based on the contextual content of the block. For example, data of a particular type may have a larger data block size compared to other types of data. Maintaining segmentation of the blocks on a write (and corresponding re-assembly on a read) may occur in the client layer 202 and/or the metadata layer 204. Also, compression may occur in the client layer 202, the metadata layer 204, and/or the block server layer 206.

In some examples, data may be stored in a volume that is referenced by the client 208. A volume may be made up of one or more volume slices. The data associated with the volume includes a list of volume slices for that volume. A volume slice is a list of blocks for a portion of a volume.

The block servers 212 may store data on a storage medium. The storage medium may include different medium formats. For example, electromechanical disk storage or a solid-state storage drive may be used. Electromechanical disk storage may include spinning disks that use movable read/write heads to read/write to/from different locations of the spinning disks. Inserting the read/write head at various random locations results in slower data access than if data is read from a sequential location. A solid-state storage drive uses a solid state memory to store persistent data. SSDs may use microchips that store data in non-volatile memory chips and may contain no moving parts. Solid state drives may also perform random access and parallel reads/writes efficiently.

Data from the clients may be stored non-sequentially. In various implementations, non-sequentially storing data in storage is based upon breaking data up into one more data blocks. In addition to storing data non-sequentially, data blocks can be stored to achieve substantially even distribution across the storage system. In various examples, even distribution can be based upon a unique block identifier. For example, the data blocks may be stored in the block server layer 206 based on unique block IDs. A block ID may also be referred to as a content ID and may be used interchangeably in the present disclosure.

A block ID can be an identifier that is determined based on the content of the data block, such as by a hash of the content (e.g., a cryptographic hash function (e.g., Skein algorithm) that generates a hash value identified herein as the block ID). In various embodiments described herein, a block ID is unique to a particular block of data. For example, blocks with the same content have the same block ID, but blocks with different content have different block IDs. The values of possible unique identifiers can have a uniform distribution. The block servers 212 maintain a mapping between a block ID and the location of the data block in a storage medium of block server 212. In one embodiment, data blocks with the same block IDs are not stored multiple times on a block server 212 when received in multiple client write requests.

A bin may be derived from the block ID for storage of a corresponding data block by extracting a predefined number of bits from the block identifiers introduced in the present disclosure. In some embodiments, the bin may be divided into buckets or "sublists" by extending the predefined number of bits extracted from the block identifier. A bin identifier may be used to identify a bin within the system. The bin identifier may also be used to identify a particular block service (e.g., block service 415a-q in the example of FIG. 4) and associated storage devices (e.g., SSDs). A sublist identifier may identify a sublist with the bin, which may be used to facilitate network transfer (or syncing) of data among block services in the event of a failure or crash of a storage node. Accordingly, a client can access data using a client address, which is eventually translated into the corresponding unique identifiers that reference the client's data at the storage node. Bin assignments may be stored in a distributed key-value store across a cluster (e.g., cluster 135) (e.g., in a so-called "zookeeper" database as just one example). Accordingly, storing data blocks based upon the unique identifier, or a portion of the unique identifier, results in the data being stored substantially evenly across storage devices in the cluster. Because client data, e.g., a volume associated with the client, is spread evenly across all of the storage devices in the cluster, every storage device in the cluster may be involved in the read and write paths of each volume. This configuration may balance the data and load across all of the storage devices. Such an arrangement may remove hot spots within the cluster, which can occur when the client's data is stored sequentially on any volume.

In addition, having data spread evenly across storage devices in the cluster allows a consistent total aggregate performance of a cluster to be defined and achieved. This aggregation can be achieved, since data for each client is spread evenly through the storage devices. Accordingly, a client's I/O will involve all the storage devices in the cluster. Because clients have their data spread substantially evenly through all the storage devices in the storage system, a performance of the system can be described in aggregate as a single number, e.g., the sum of performance of all the storage devices in the storage system.

Furthermore, data may be deduplicated in a cluster based on the block IDs. For example, if multiple of clients 208a-n each store the same data, the stored data can have the same block ID (as the block ID is based on the content of the data block). As a result, that particular data block need only be stored once in the, as opposed to storing the data block separately for all of the multiple clients 208a-n. Accordingly, the amount of storage in use can be reduced by storing only unique data blocks. One effect of this deduplication of data is that the unique storage space used by a volume compared to other volumes in a cluster cannot be determined from the size of the logical volume (e.g., as tracked by the metadata layer 204). This is because a volume may share at least some of its data with another volume in the cluster, such that when the volume is deleted the shared data portion will still remain in the cluster, and available to the other volume. For example, if a data block is shared between two data objects (e.g., between two snapshots or between a snapshot and an active data set), the data block is stored once and referenced by each of the two data objects.

The present disclosure provides techniques for gathering various insights into characteristics of blocks of data by, for example, providing an efficient characteristic estimation approach that makes use of a statistical sampling of a set of block IDs for a particular level of a data store of a distributed storage system. For example, the content manager 124 may estimate, among other metrics, one or more of (i) the total amount of data for a particular account or a particular volume that is stored in uncompressed form and/or compressed form, (ii) the entropy of uncompressed data; (iii) the total amount of data compressed with a particular type of compression algorithm; and (iv) the total amount of various types of data. If the client desires to obtain one of the aforementioned, the content manager 124 may generate an efficiency set for the particular type of level of the data store at issue or may make use of an appropriate API call.

The metadata layer 204 may store metadata that maps between the client layer 202 and the block server layer 206. For example, metadata servers 210 may map between the client addressing used by the clients 208 (e.g., file names, object names, LBAs, etc.) and block layer addressing (e.g., block IDs) used in the block server layer 206. The clients 208 may perform access based on client addresses, and block servers 212 may store data based on unique block IDs for the data.

Figure 3:
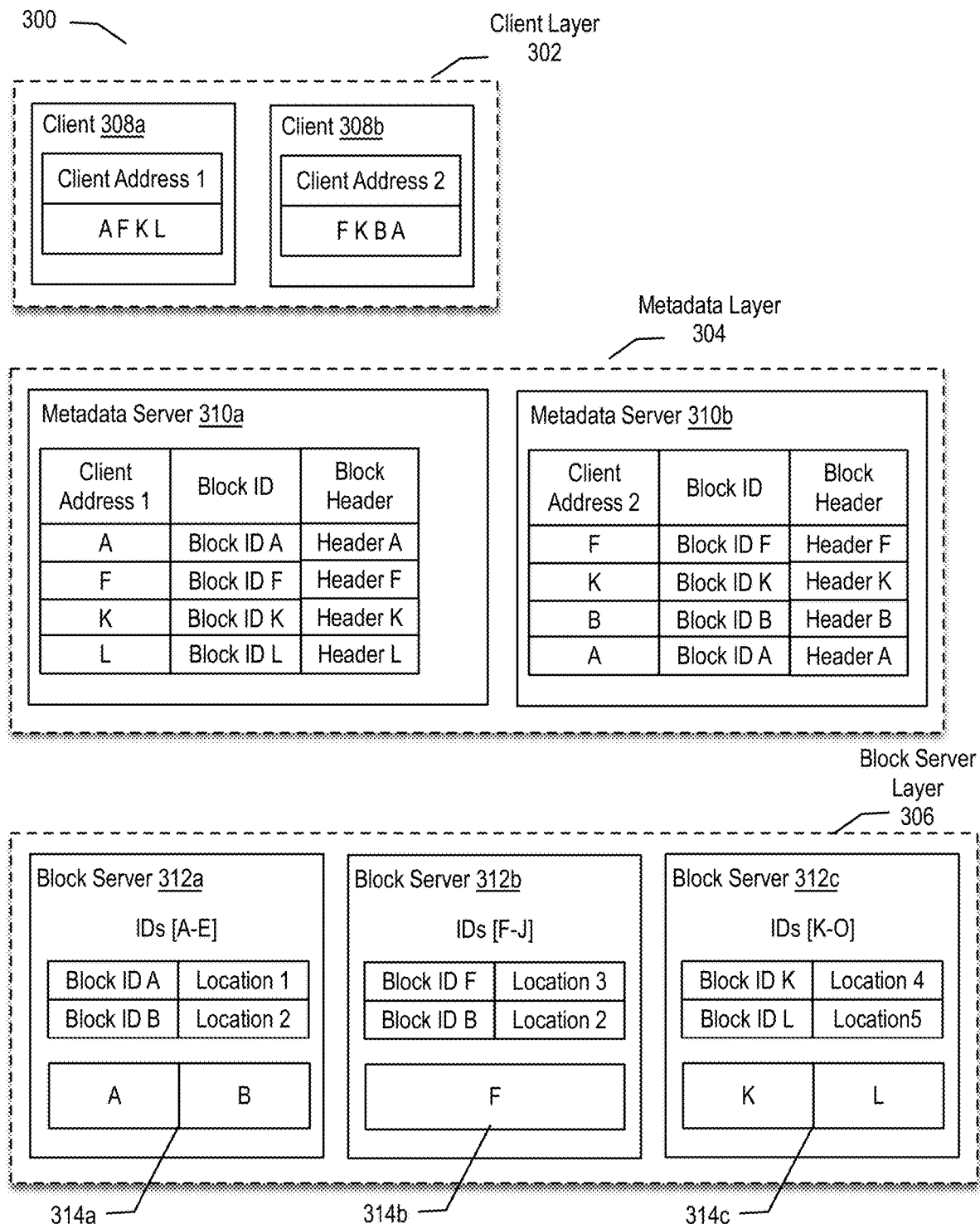
FIG. 3 is a block diagram providing a more detailed example of data storage in a distributed storage system according to various embodiments of the present disclosure.

FIG. 3 is a block diagram providing a more detailed example 300 of data storage in a distributed storage system according to various embodiments of the present disclosure. A client 308a-b (which may correspond to clients 208a-b) may wish to read data from and/or write data to the distributed data storage system. For example, client 308a may wish to write data to a volume at a client address 1. Client address 1 may include a target name of the volume and a list of block numbers (e.g., LBAs). The data that client 308a wishes to write may include data blocks A, F, K, and L (e.g., the content to be written).

Client 308*b* may wish to write data at a client address 2. For example, client address 2 may reference a different volume than client address 1 and a different list of block numbers. Other formats of client addressing may also be used. For discussion purposes, client address 1 and client address 2 may be used to reference the respective data blocks and block numbers (e.g., LBAs). The data that client 308*b* wishes to write may include data blocks F, K, B, and A. Accordingly, data blocks A, F, and K are duplicates between the data that the client 308*a* and the client 308*b* respectively wish to write.

The metadata layer 304 may include the metadata server 310*a*-*b* (which may correspond to metadata server 210*a*-*b*). Different metadata servers may be associated with different client addresses. For example, different metadata servers 310 may manage different volumes of data. In this example, metadata server 310*a* is designated as handling client address 1, and metadata server 310*b* is designated as handling client address 2.

For each client address, a list of block numbers may be stored. The block numbers may represent data blocks associated with the client address. For example, for client address 1, the block IDs of data blocks A, F, K, and L are stored and associated with client address 1. Additionally, block headers (e.g., headers A, F, K, and L) may also be associated with client address 1. Alternatively, the block headers may be part of the stored data. In one embodiment, the block headers contain metadata for the corresponding data block and may include information indicative of whether the data is stored in uncompressed form or compressed form, and if, compressed, the particular compression algorithm used and the size of the data in compressed form.

Each block identifier is associated with a block of data (e.g., block ID A is associated with the data block A, block ID B is associated with the data block B, etc.). Similarly, in metadata server 210*b*, the client address 2 is associated with block IDs of data blocks F, K, B, and A (e.g., block ID F for data block F, etc.).

The block server layer 306 includes block servers 312*a*-*c*. In an example, the block servers 312 are assigned to different ranges of block identifiers. For example, block server 312*a* may be assigned to store data for block identifiers A-E, block server 312*b* may be assigned to store data for block identifiers F-J, and block server 312*c* may be assigned to store data for block identifiers K-O. In this example, data for a client address may not be stored in sequential locations on a storage medium in a single block server 312. Rather, the data may be stored based on the block ID determined from the content of the data.

In the context of the present example, the block server 312*a* stores data for block identifier A and block identifier B. Thus, the block server 312*a* stores data blocks A and B, based on the corresponding block identifiers A and B. Additionally, the block server 312*a* may maintain a mapping between the block identifier A and the location on the storage medium where the data associated with block identifier A is stored. For example, block identifier A may be mapped to a location 1 where data for block identifier A (e.g., data block A) is stored on block server 312*a*, and block identifier B may be mapped to a location 2 where data for block identifier B (e.g., data block B) is stored on block server 312*a*. Additionally, block server 312*b* stores data for block identifier F in location 2 on block server 312*b*, and block server 312*c* stores data for block identifiers K and L in locations 4 and 5, respectively, in block server 312*c*.

In some examples, the data blocks for a client address are not stored in sequential locations on a storage medium 314. For example, for client address 1, data block A may be stored on block server 312*a* in storage medium 314*a*, data block F is stored on block server 312*b* in storage medium 314*b*, and data blocks K and L are stored on block server 312*c* in storage medium 314*c*. In some examples, the storage medium 314 in a block server 312 may be a state device, such as non-volatile memory (e.g., flash memory). The solid-state device may be electrically programmed and erased. The data blocks may be stored on the solid-state device and persisted when block server 312 is powered off. Solid state devices allow random access to data in an efficient manner and include no physical moving parts. For example, the random access is more efficient using solid state devices than if a spinning disk is used. Thus, data stored in data blocks for a client address in a non-contiguous address space and even different block servers 312 may still be accessed efficiently. In some examples, the storage medium 314 may include multiple SSDs (e.g., flash memory drives). Each drive may store data (e.g., data blocks) for a portion of the range of block IDs. Although a solid-state device is described, it will be understood that spinning disks may also be used with particular embodiments.

One or more servers of a volume (e.g., servers of metadata layer 304, block server layer 306, etc.) can be configured to generate sets of block IDs that correspond to the data blocks of the volume. In various embodiments described herein, rather than using all block IDs within a set of block IDs, the set of block IDs may be statistically sampled to produce an efficiency set. The use of an efficiency set can be used to decrease computation time of various operations, such as calculating or estimating one or metrics relating to the data stored in the corresponding data blocks for a particular data set (e.g., a set of one or more volumes, a volume of data, a set of one or more snapshots stored on a volume).

As described in further detail below, an efficiency set may be created by obtaining all block IDs for a block of volume data, masking (e.g., via a bitwise OR operation, a bitwise AND operation, changing a bit to become a "0" or "1", or otherwise) each block ID, and comparing the masked block ID to a masked comparison block identifier (also referred to herein as a masked comparator) to form an efficiency set for a volume. A mask may also be referred to as a bitmask. In an example, one or more bits of a block ID are masked to a binary "0". In another example, one or more bits of a block ID are masked to a binary "1". In another example, whether one or more particular bits are masked to be "0" or "1" is random and independent of a mask applied to other bits. For example, a random seed may be used to generate a random number on which an entire bitmask or comparison block ID is based, or it may be used to randomly determine whether a particular bit is masked to become a "0" or "1". Each of the masked block IDs may be compared to the masked comparison block identifier. If a masked block ID matches the masked comparison block ID, then the unmasked block ID corresponding to the masked block ID is determined to be part of the applicable efficiency set. An unmasked block ID corresponds to a masked block ID if a result of applying the mask to the unmasked block identifier yields the masked block identifier as the result.

In an example, an amount of bits to be masked in order to generate an efficiency set is increased iteratively until a desired sample size is achieved, which may be based on, among other things, a desired memory storage requirement and/or computation requirement. For example, the size of a bitmask (i.e., the number of bits being masked or the order of the bitmask) may be increased until a resulting efficiency set only consumes a certain amount of memory space or computational resources to further process. Thus, each volume can have a corresponding efficiency set based on its block IDs and an applied mask. Additionally, or alternatively, efficiency sets can be generated from block IDs corresponding to data sets stored one or more volumes, multiple volumes of a cluster of data, and/or the block IDs of an entire cluster, etc. By creating and maintaining such efficiency sets, metrics for various types of data sets, volumes (or clusters) of data, etc., may be quickly estimated. The present disclosure provides techniques for using efficiency sets to estimate (i) the total amount of data for a particular account or a particular volume that is stored in uncompressed form and/or compressed form, (ii) the entropy of uncompressed data; (iii) the total amount of data compressed with a particular type of compression algorithm; and (iv) the total amount of various types of data (e.g., images, medical data, binary data, and English text).

Example Storage Node

Figure 4:
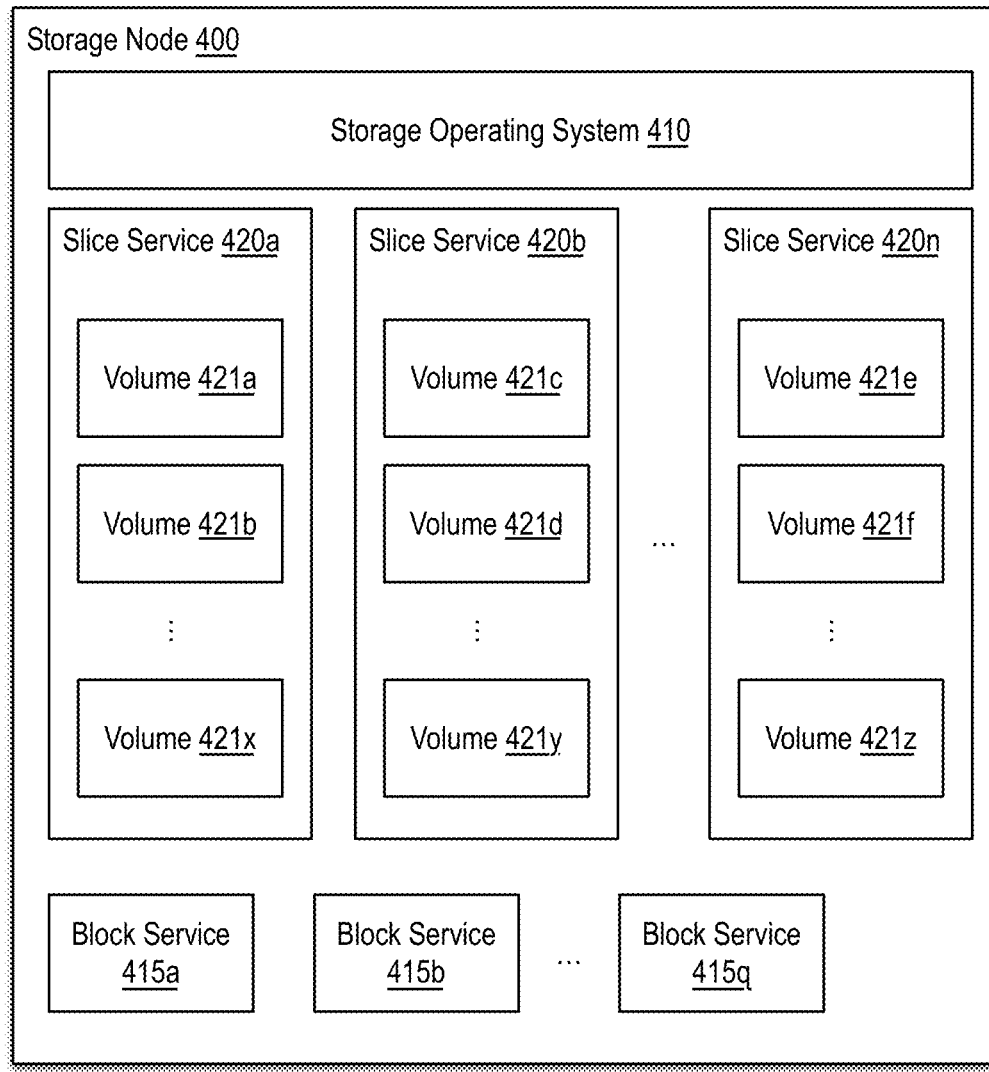
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes 136a-n. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 410 reducing the amount of read or write data that is being processed by the storage node 400

As noted above, in some embodiments, a collector module (e.g., collector 138) and/or a content manager (e.g., content manager 124) may obtain various telemetry data of a distributed storage system (e.g., cluster 135) via an API (e.g., API 137) of the distributed storage system of which the storage node 400 is a part. The telemetry data may represent performance metrics, storage efficiency metrics, configuration and other system data associated with various levels or layers of the cluster or the storage node 400. For example, metrics may be available for individual or groups of storage nodes (e.g., 136a-n), individual or groups of volumes 421, individual or groups of slice services 420, and/or individual or groups of block services 415.

Characteristic Estimation Processing

Figure 5:
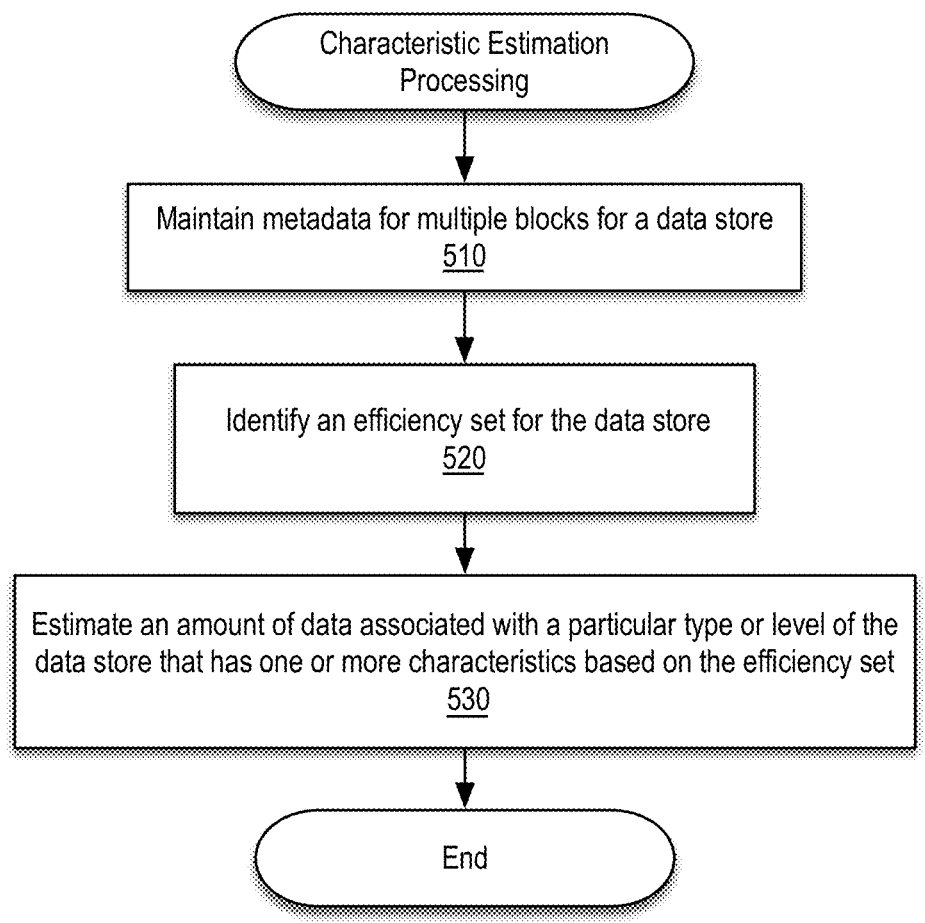
FIG. 5 is a flow diagram illustrating characteristic estimation processing in accordance with an embodiment of the present disclosure.

FIG. 5 is a flow diagram illustrating characteristic estimation processing in accordance with an embodiment of the present disclosure. As noted above, for a particular data set (e.g., a particular type or level of a data store within the storage system), it may be useful to have insights into various characteristics of the blocks of data themselves to facilitate tuning and/or otherwise improving the operations of the distributed storage system.

At block 510, metadata is maintained for multiple blocks of a data store. For example, metadata (e.g., client addresses, such as LBAs, block IDs, and block headers) may be stored in one or more of a client layer (e.g., client layer 302), a metadata layer (e.g., metadata layer 304), and a block server layer (e.g., block server layer 306).

At block 520, an efficiency set may be identified for the data store. For example, responsive to a request by a client (e.g., client 308a-b or computer system 110), a content manager (e.g., content manager 124) may make use of an API of a distributed storage system (e.g., cluster 135) to generate an efficiency set for a particular data set (e.g., a snapshot, an account, or a volume) within the distributed storage system. Alternatively, the content manager 124 may itself generate the efficiency set. An efficiency set generally refers to a subset of a set of block IDs associated with a particular data set that may be used to calculate/estimate one or metrics relating to the data stored in corresponding data blocks. A non-limiting approach for creating an efficiency set is described below with reference to FIG. 6.

At block 530, an amount of data associated with a particular type or level of the data store that has one or more characteristics may be estimated based on the efficiency set. According to one embodiment, estimates may regarding one or more of (i) the total amount of data for a particular account or a particular volume that is stored in uncompressed form and/or compressed form, (ii) the entropy of uncompressed data; (iii) the total amount of data compressed with a particular type of compression algorithm; and (iv) the total amount of various types of data. As noted above, in one embodiment, a block header may contain metadata for a corresponding data block and may include information indicative of whether the data is stored in uncompressed form or compressed form, and if, compressed, the particular compression algorithm used of multiple available compression algorithms and the size of the data in compressed form. As such, in one embodiment, based on the block IDs in the efficiency set, analysis of the relevant block header metadata and/or the data stored in the corresponding data blocks may be performed.

According to one embodiment, an estimate of the total amount of data for a particular account or a particular volume that is stored in uncompressed form and/or compressed form may be determined by, for each block ID in the efficiency set, aggregating the size of the block (for uncompressed data blocks) or the compressed size indicated in the block header (for compressed data blocks) and then using the calculated amount of data for the sample set and information regarding the size of the sample set relative to the whole to extrapolate an estimated value for the particular account or the particular volume. For example, if the efficiency set is known to represent X percent (e.g., two percent) of a particular volume, the calculated amount of data for the sample set may be multiplied by 100/X to produce an estimate for the entire volume.

According to one embodiment, the entropy of uncompressed data for a particular account or a particular volume may be estimated by, for each block ID in the efficiency set, retrieving the data block (if it is uncompressed) and calculating an intermediate entropy result for the data block. Then, the intermediate entropy results may be averaged used to extrapolate an estimated entropy for all uncompressed data for the particular account or the particular volume data. Based on this metric, improvements, such as evaluating the potential compressibility of uncompressed data meeting a predetermined entropy threshold by one or more compression algorithms may be made. Such improvements may be the result of an automated process and/or manual configuration by a user (e.g., an administrator associated with a managed service provide and/or administrators of one or more customers of the managed service provider).

According to one embodiment, an estimate of the total amount of data compressed with a particular type of compression algorithm for a particular account or a particular volume may be determined by, for each block ID in the efficiency set, aggregating the compressed size indicated in the block header (separately for each compression algorithm employed by the system) and then using the calculated amount of data for the sample set and information regarding the size of the sample set relative to the whole to extrapolate an estimated value for the particular account or the particular volume. Based on these metrics, improvements, such as making available additional compression algorithms, may be made. Such improvements may be the result of an automated process and/or manual configuration by the user.

In some embodiments, it may be useful to obtain information regarding an estimate of the total amount of data representing one or more of multiple types of data stored within a particular data set. As those skilled in the art will appreciate a categorizer (e.g., in the form of a machine-learning (ML) model) may be trained to recognize various types of data. As such, the estimate of the total amount of data for a particular type of data may be determined by, for each block ID in the efficiency set, aggregating the sizes of those blocks identified by the categorizer as containing data of the particular type. Once data is categorized in this manner, improvements, such as applying specific compressors for certain types of data may be made. Such improvements may be in the form of an automated process and/or manual configuration by the user.

Efficiency Set Creation

Figure 6:
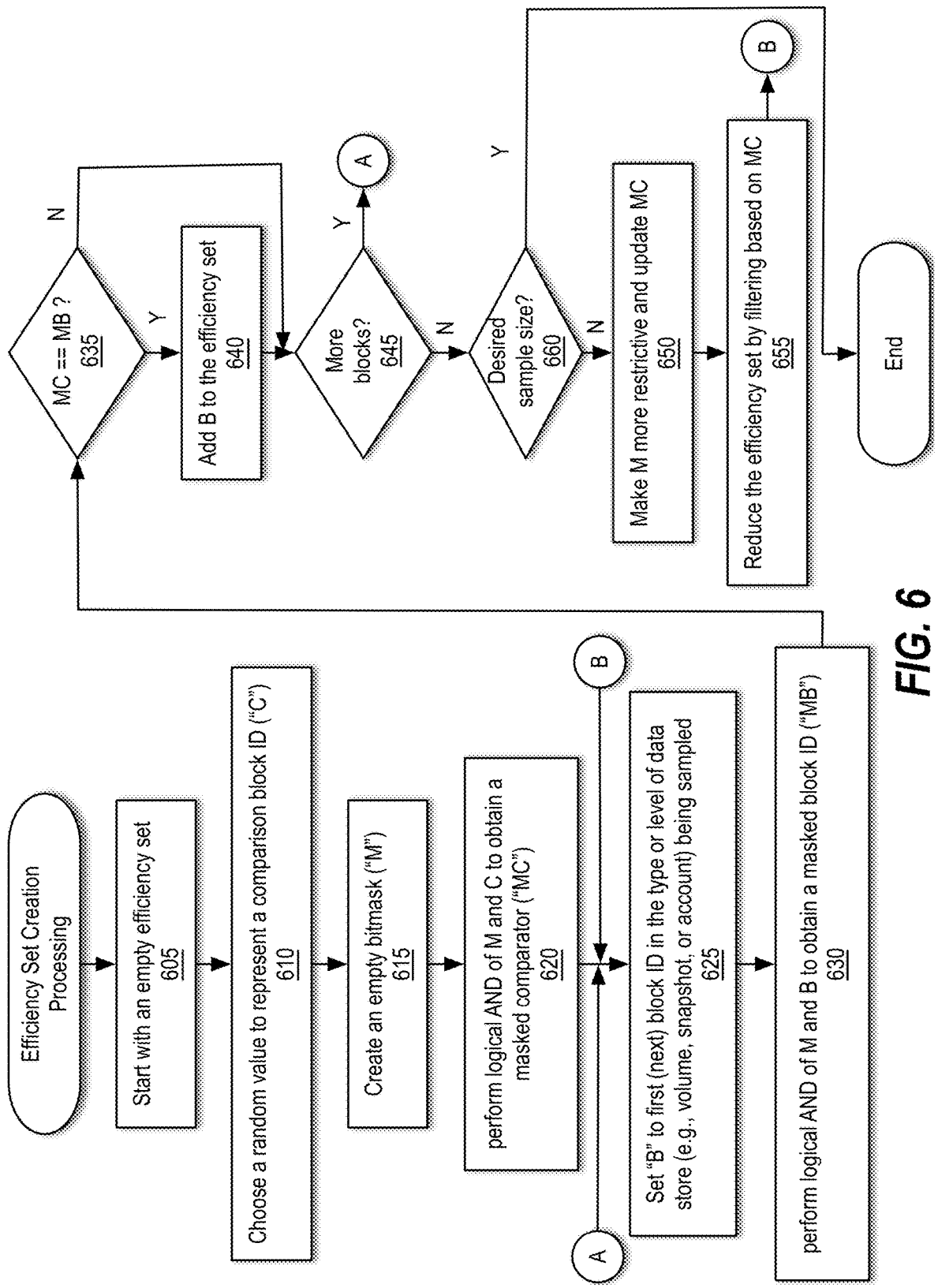
FIG. 6 is a flow diagram illustrating efficiency set creation processing in accordance with an embodiment of the present disclosure.

FIG. 6 is a flow diagram illustrating efficiency set creation processing in accordance with an embodiment of the present disclosure. In the context of the present example, an efficiency set is created for a particular data set (e.g., a particular type or level of a data store within the storage system, such as a snapshot, an account, or a volume).

According to one embodiment, an efficiency set has the following properties:

It is statistically equivalent to a random sample chosen from all the blocks in the data set (not from the LBAs, multiple of which may refer to the same unique block ID), from the unique data blocks referenced by the volume. So, for example, if there are a million instances of block A and one instance of block B, then the block IDs corresponding to block A and B should be equally likely to be in the efficiency set.

It may be bounded in size. Empirical data suggests, in the context of millions of unique block IDs, a statistical uncertainty of about 3% may be achieved with an efficiency set of between approximately 1,000 and 2,000 block IDs.

At block 605, the process beings with an empty efficiency set.

At block 610, a random value is selected to represent a comparison block ID ("C"). According to one embodiment, C is a set of bits the same length as a block ID (or may be a truncated block ID).

At block 615, an empty bitmask ("M") is created. For example, M may be a set of bits the same length as a block ID all initially set to zero.

At block 620, a logical AND operation is performed between M and C to obtain a masked comparator ("MC"). For the first iteration, MC is initially all zeroes due to the initial value of M.

At block 625, a block ("B") is set to the first or next block of the particular data set at issue. Assuming, for sake of example, the particular data set at issue is a particular volume, the list of blocks through which to loop may be obtained from the volume metadata, which may include a list of volume slices for the volume each of which may further include a list of blocks for a portion of the volume.

At block 630, a logical AND of M and B is performed to obtain a masked block ID ("MB").

At decision block 635, it is determined whether MC is equal to MB. If so, then processing continues with block 640 in which B is added to the efficiency set; otherwise processing branches to decision block 645. It will be appreciated during the first iteration through the blocks all blocks are initially added to the efficiency set as both MC and MB will be all zeroes, thereby filtering none of the blocks.

At decision block 645, it is determined whether additional blocks remain to be processed. If so, then processing loops back to block 625 to process the next block in the data set; otherwise, processing continues with block 650.

At decision block 660, it is determined if the desired sample size has been achieved. Depending upon the particular implementation, the desired sample size may be a predetermined or configurable value to reduce the efficiency set to a size at which characteristic estimation (e.g., block 530 of FIG. 5) for the block IDs in the efficiency set can be performed within a desired memory storage requirement and/or computation requirement is satisfied. In alternative embodiments, the desired sample size may be selected to achieve a particular level of statistical certainty regarding how representative the efficiency set is with respect to the entire list of block IDs at issue.

At block 650, the bitmask, M, is made more restrictive and MC is updated. Depending upon the particular implementation, this involves setting one of the set of bits of M currently having a value of zero to the value of one. In one embodiment, M may be shifted left and a one bit may be inserted at the right-most bit position. Alternatively, M may be right-shifted and a one bit may be inserted in the left-most bit position. Regardless of the mechanism for making M more restrictive, M is then logically ANDed with C to produce a potentially new value of MC.

At block 655, the efficiency set is reduced by filtering it based on MC. For example, each block ID in the efficiency set may be logically ANDed with M to produce a masked efficiency set block ID that can then be compared to MC. When the masked efficiency set block ID at issue is equal to MC, then the corresponding block ID is retained in the efficiency set; otherwise, the corresponding block ID is removed from the efficiency set. Assuming MC became more restrictive as a result of the update performed in block 650, the filtering of the efficiency set by MC has the potential to result in half of the block IDs within the efficiency set being discarded. At this point, processing loops back to block 625 to repeat the process with the updated MC. It is to be appreciated that looping through the list of block IDs at issue multiple times, has the effect of making the membership test for being a member of the efficiency set stricter as more data comes in. For purposes of illustration, an example of a subset of iterations of the efficiency set creation processing is conceptually represented by FIGS. 7A-B.

Figure 7A:
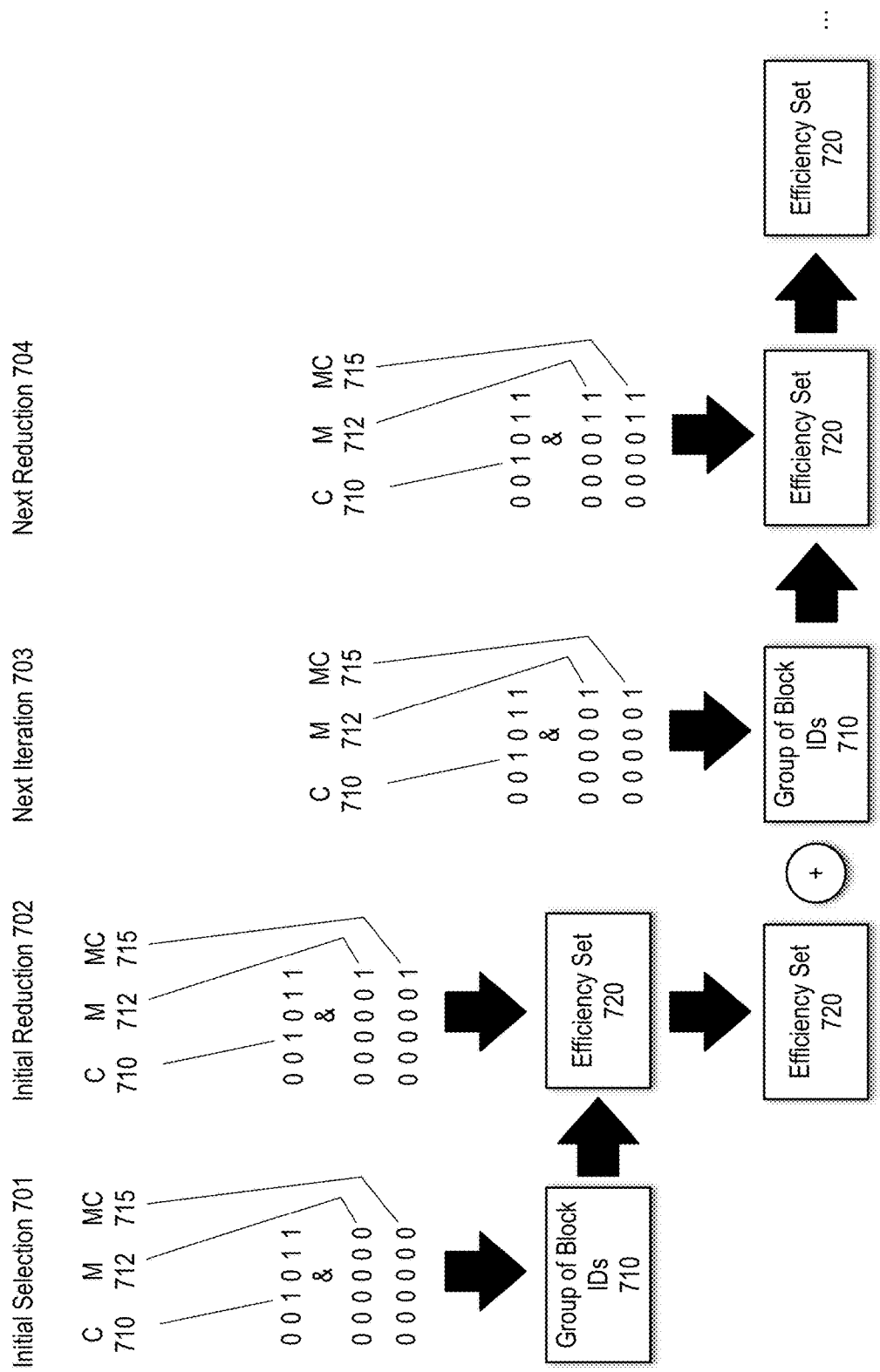
FIG. 7A is a block diagram conceptually illustrating a subset of iterations of an efficiency set creation process in accordance with an embodiment of the present disclosure.

FIG. 7A is a block diagram conceptually illustrating a subset of iterations of an efficiency set creation process in accordance with an embodiment of the present disclosure. In the context of the present example, C 710 may represent the comparison block ID selected at block 610 of FIG. 6, M 271 may represent the bitmask, which is initially set to the empty state at block 615 and subsequently made more restrictive at block 650 of FIG. 6, and MC may represent the masked comparator, which is initially set at block 620 of FIG. 6 and subsequently updated at block 650 of FIG. 6. Furthermore, initial selection 701 may correspond to blocks 605-645 of FIG. 6, initial reduction 702 may correspond to blocks 650-655 of FIG. 6, next iteration 703 may correspond to a subsequent iteration through blocks 625-645 of FIG. 6, and next reduction 704 may correspond to a subsequent reduction by blocks 650-655 of FIG. 6.

While only two example iterations of the efficiency set creation processing are illustrated, it is to be appreciated the iterations of blocks 625-645 of FIG. 6 and the reduction of the efficiency set performed at block 655 of FIG. 6 may continue until the desired sample size is achieved.

While in this example, six-bit block IDs are assumed for sake of illustration, those skilled in the art will appreciate depending upon the particular implementation block IDs may comprise more of fewer bits than illustrated.

FIG. 7B illustrates an initial group of block IDs 710 and an example efficiency set 720 as it changes as a result of the iterations of FIG. 7A. In the context of the present example, it can be seen the initial selection 701 from the group of block IDs 710 (e.g., representing the list of block IDs for the data set at issue) performed by blocks 605-645 of FIG. 6 results in all of the block IDs in the group of block IDs 710 initially being added to the efficiency set 720 and the initial reduction 702 results in about half of the block IDs being filtered. In the next iteration 703, the MC 712 updated at block 650 causes fewer of the initial group of block IDs 710 to be selected. And during the next reduction 704 (e.g., blocks 650-655 of FIG. 6), the efficiency set 720 is further reduced by applying a potentially more restrictive MC as a result of M being made more restrictive at block 650 of FIG. 6.

Example User Interface

According to one embodiment, insights into various characteristics of the blocks of data may be presented to a user (e.g., an administrative user of a distributed storage system or an administrative user of a managed service provider responsible for managing the distributed storage system via a client 308*a-b* or computer system 110).

Figure 8A:
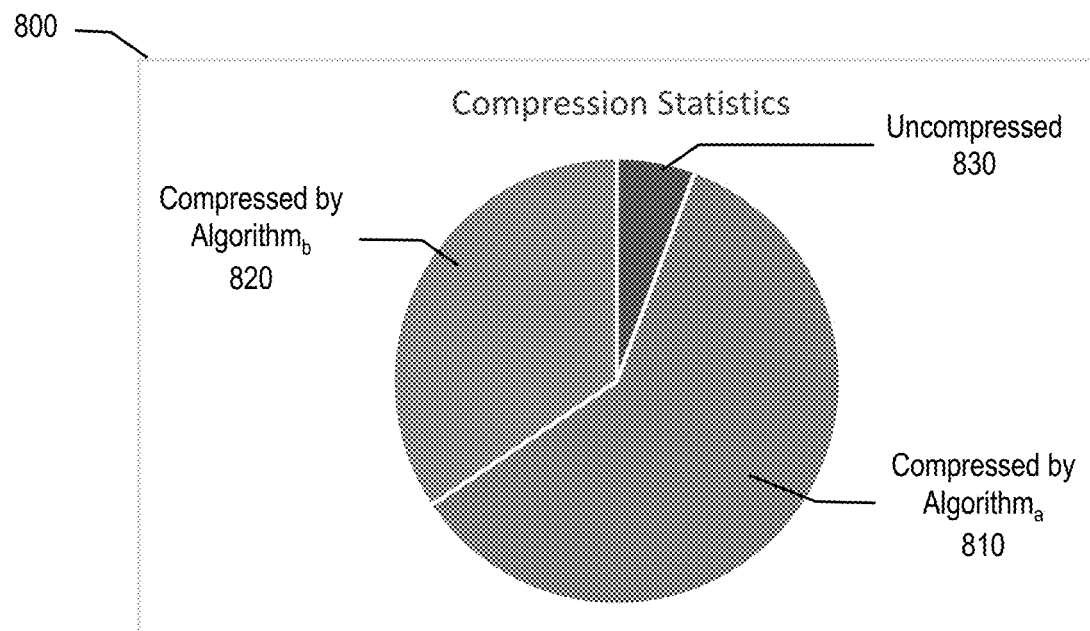
FIG. 8A is a pie chart representing compression statistics in accordance with an embodiment of the present disclosure.

FIG. 8A is a pie chart 800 representing compression statistics in accordance with an embodiment of the present disclosure. In the context of the present example, a graphical representation of the one or more metrics relating to compression of data stored in the data blocks associated with the data set at issue is depicted. For example, an estimate of the total amount of data compressed by a first of multiple compression algorithms (e.g., compressed by algorithm$_a$ 810), an estimate of the total amount of data compressed by a second of multiple compression algorithms (e.g., compressed by algorithm, 820), and an estimate of the total amount of data stored in uncompressed form (e.g., uncompressed 830) may be graphically represented in the form of various corresponding wedges (slices) of the pie chart 800.

It is to be appreciated, pie chart 800 represents a non-limiting example of one type of feedback mechanism that may be provided to the user (e.g., displayed within a graphical user interface (GUI) presented to the user via a browser-based interface) based on the results of a characteristic estimation process (e.g., as described above with reference to FIG. 5).

Figure 8B:
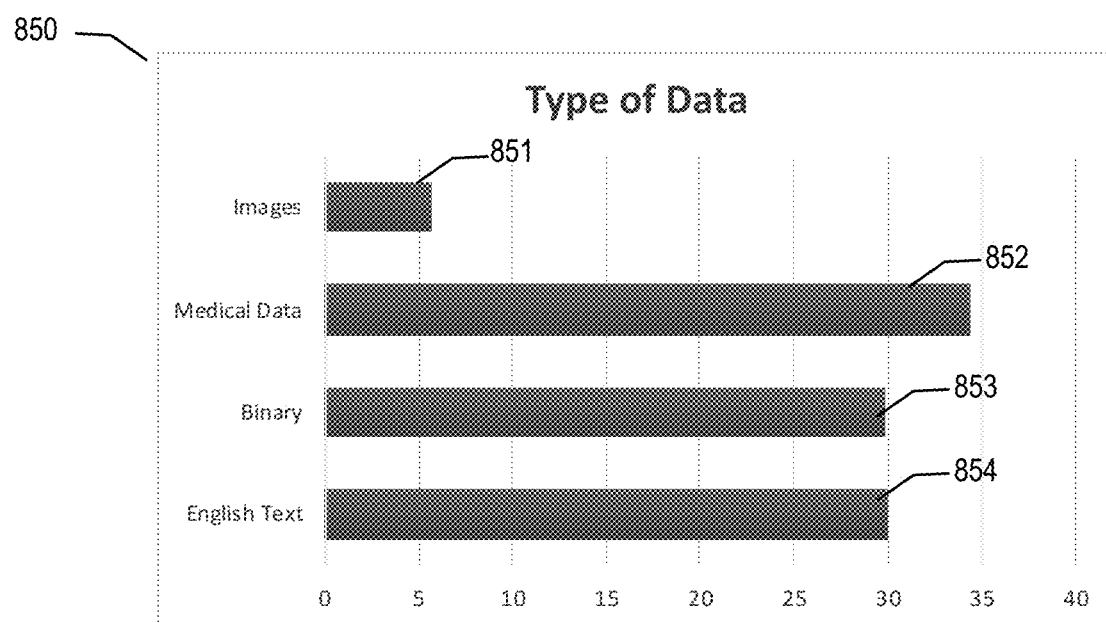
FIG. 8B is a bar chart depicting amounts of storage consumed by various types of data in accordance with an embodiment of the present disclosure.

FIG. 8B is a bar chart 850 depicting amounts of storage consumed by various types of data in accordance with an embodiment of the present disclosure. In the context of the present example, a graphical representation of the one or more metrics relating to multiple types of data stored in the data blocks associated with the data set at issue is depicted. For example, a first bar 851 may represent an estimate of the total amount of storage space of the data set at issue that is consumed by a first type of data (e.g., images), a second bar 852 may represent an estimate of the total amount of storage space of the data set at issue that is consumed by a second type of data (e.g., medical data), a third bar 853 may represent an estimate of the total amount of storage space of the data set at issue that is consumed by a third type of data (e.g., binary data), and a fourth bar 854 may represent an estimate of the total amount of storage space of the data set at issue that is consumed by a fourth type of data (e.g., English text).

It is to be appreciated, pie chart 800 represents a non-limiting example of one type of feedback mechanism that may be provided to the user (e.g., displayed within a graphical user interface (GUI) presented to the user via a browser-based interface) based on the results of a characteristic estimation process (e.g., as described above with reference to FIG. 5).

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 9:
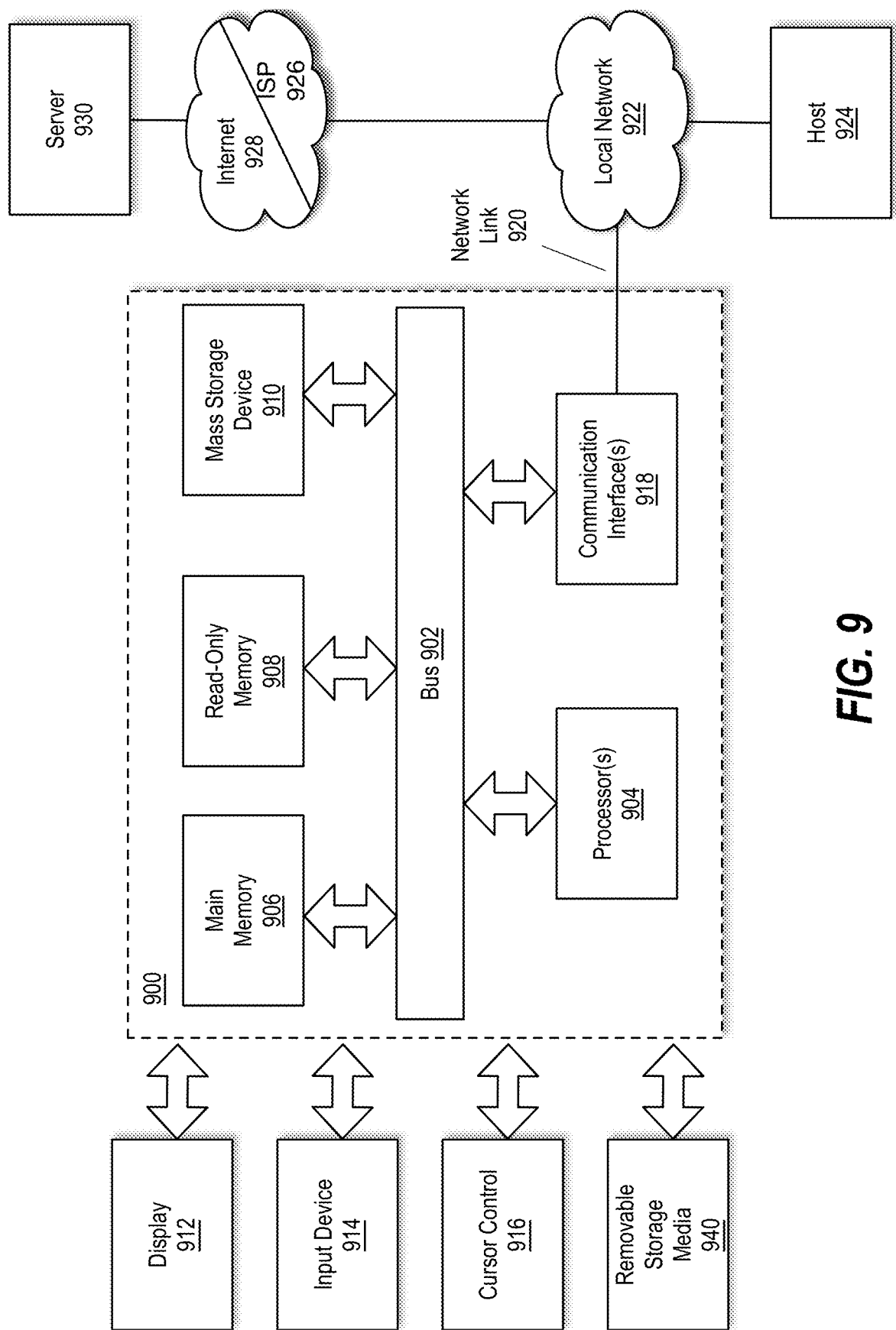
FIG. 9 illustrates an example computer system in which or with which embodiments of the present disclosure may be utilized.

FIG. 9 is a block diagram that illustrates a computer system 900 in which or with which an embodiment of the present disclosure may be implemented. Computer system 900 may be representative of all or a portion of the computing resources associated with a storage node (e.g., storage node 136), a collector (e.g., collector 138), a monitoring system (e.g., monitoring system 122), a content manager 124) or an administrative workstation (e.g., computer system 110). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., a hardware processor 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A non-transitory computer-readable storage medium embodying a set of instructions, which when executed by one or more processing resources of a storage system cause the storage system to:

determine a first metric for data having a characteristic relating to a state of compression, application of a particular compression algorithm, entropy, or a type of data stored in a subset of storage units corresponding to a sample that includes a subset of storage unit IDs statistically equivalent to a random sample chosen from among storage unit IDs of a particular data set of the storage system by, for each ID within the sample, analyzing one or more of metadata associated with a storage unit to which the ID corresponds and data contained in the storage unit; and estimate a second metric for data having the characteristic within an entirety of the particular data set based on the first metric.

2. The non-transitory computer-readable storage medium of claim 1, wherein the first metric comprises a first amount of storage space of the storage system consumed by the data having the characteristic within the sample and wherein the second metric comprises a second amount of storage space of the storage system consumed by the data having the characteristic within the entirety of the storage unit IDs of the particular data set.

3. The non-transitory computer-readable storage medium of claim 1, wherein the particular data set represents an account of a particular subscriber of a plurality of subscribers of a storage service supported by the storage system.

4. The non-transitory computer-readable storage medium of claim 1, wherein the particular data set represents one or more volumes associated with the storage system.

5. The non-transitory computer-readable storage medium of claim 1, wherein the type of data comprises images, medical data, binary data, or text and is recognizable by analyzing the data contained in a given storage unit in the subset of storage units.

6. The non-transitory computer-readable storage medium of claim 1, wherein the sample is generated based on invocation of a method of an application programming interface (API) exposed by the storage system by an external actor.

7. The non-transitory computer-readable storage medium of claim 1, wherein the storage units comprise data blocks instructions further cause the storage system to tune one or more configuration parameters of the storage system based on the second metric.

8. The non-transitory computer-readable storage medium of claim 7, wherein the one or more configuration parameters include a type of compression algorithm to be employed for an account of a particular subscriber of a plurality of subscribers of a storage service supported by the storage system, for one or more volumes associated with the storage system, for one or more types of data stored by the particular subscriber, or for one or more types of data stored on the one or more volumes.

9. The non-transitory computer-readable storage medium of claim 7, wherein the metadata associated with a given storage unit contains information indicative of whether the data is stored in uncompressed form or compressed form, and when, compressed, the particular compression algorithm used and a size of the data in compressed form.

10. The non-transitory computer-readable storage medium of claim 1, wherein the sample is iteratively built until a desired sample size has been achieved.

11. A method performed by one or more processors of a storage system, the method comprising:
generating a sample including a subset of storage unit identifiers (IDs) from among storage unit IDs of a particular data set of the storage system to facilitate calculation of a metric pertaining to a characteristic relating to a state of compression, application of a particular compression algorithm, entropy, or a type of data stored in a subset of storage units corresponding to the sample;
determining a first metric for data having the characteristic within the sample by, for each ID within the sample, analyzing one or more of metadata associated with a storage unit to which the ID corresponds and data contained in the storage unit; and
estimating a second metric for data having the characteristic within an entirety of the particular data set based on the first metric.

12. The method of claim 11, wherein the first metric comprises a first amount of storage space consumed by the data having the characteristic within the sample and wherein the second metric comprises a second amount of storage space consumed by the data having the characteristic within the entirety of the storage unit IDs of the particular data set.

13. The method of claim 11, wherein the particular data set represents an account of a particular subscriber of a plurality of subscribers of a storage service supported by the storage system or a subset of one or more volumes associated with the storage system.

14. The method of claim 11, wherein the type of data comprises images, medical data, binary data, or text and wherein the second metric is indicative of a total amount of storage space consumed by the type of data within the entirety of the particular data set.

15. The method of claim 11, further comprising tuning one or more configuration parameters of the storage system based on the one or more metrics.

16. The method of claim 15, wherein the one or more configuration parameters include a type of compression algorithm to be employed for an account of a particular subscriber of a plurality of subscribers of a storage service supported by the storage system, for one or more volumes associated with the storage system, for one or more types of data stored by the particular subscriber, or for one or more types of data stored on the one or more volumes.

17. A storage system comprising:
a means for statistically sampling storage unit identifiers (IDs) of a particular data set of the storage system;
one or more processing resources; and
instructions that when executed by the one or more processing resources cause the storage system to:
cause said means for statistically sampling to create a sample including a subset of storage unit IDs from among the storage unit IDs of the particular data set to facilitate calculation of one or more metrics pertaining to a characteristic relating to a state of compression, application of a particular compression algorithm, entropy, or a type of data stored in a subset of storage units corresponding to the sample;
determine a first metric for data having the characteristic within the sample by, for each ID within the sample, analyzing one or more of metadata associated with a storage unit to which the ID corresponds and data contained in the storage unit; and
estimate a second metric for data having the characteristic within an entirety of the particular data set based on the first metric.

18. The storage system of claim 17, wherein the first metric comprises a first amount of storage space of the storage system consumed by the data having the characteristic within the sample and wherein the second metric comprises a second amount of storage space of the storage system consumed by the data having the characteristic within the entirety of the storage unit IDs of the particular data set.

19. The storage system of claim 17, wherein the particular data set represents an account of a particular subscriber of a plurality of subscribers of a storage service supported by the storage system or one or more volumes associated with the storage system.

20. The storage system of claim 17, wherein the type of data comprises images, medical data, binary data, or text and wherein the second metric is indicative of a total amount of storage space consumed by the type of data within the entirety of the particular data set.

21. The storage system of claim 17, wherein the instructions further cause the storage system to tune one or more configuration parameters of the storage system based on the one or more metrics.

22. The storage system of claim 21, wherein the one or more configuration parameters include information regarding a compression algorithm to be employed for an account of a particular data storage subscriber of a plurality of data storage subscribers utilizing the storage system, for one or more volumes associated with the storage system, for one or more types of data stored by the particular subscriber, or for one or more types of data stored on the one or more volumes.

23. A method performed by one or more processors of a storage system, the method comprising:
maintaining metadata associated with a plurality of blocks of a particular type or level of a data set of the storage system, wherein the metadata includes a plurality of block identifiers (IDs) each corresponding to a respective data block of the plurality of data blocks, and wherein each data block of the plurality of data blocks contains data;
creating a sample representing a subset of the plurality of block IDs that is statistically equivalent to a random sample chosen from the plurality of block IDs; and
for each characteristic of one or more characteristics relating to a state of compression, application of a particular compression algorithm, entropy, or a type of data contained in a subset of the plurality of data blocks to which the subset of the plurality of block IDs corresponds, estimating a total amount of data stored in the particular type or level of the data set having the characteristic based on one or more of the metadata and the data contained in respective data blocks of the subset of the plurality of data blocks.

24. The method of claim 23, wherein the particular type or level of the data set comprises an account of a particular subscriber of a plurality of subscribers of the storage system, one or more volumes associated with the storage system, or a snapshot.

25. The method of claim 23, wherein said estimating comprises:
determining a first amount of the data contained in the respective data blocks of the subset of the plurality of data blocks having the characteristic; and extrapolating the total amount based at least in part on the first amount.

\* \* \* \* \*